United States Patent
Hishida et al.

(10) Patent No.: US 6,580,436 B1
(45) Date of Patent: Jun. 17, 2003

(54) TERMINAL DEVICE FOR MOBILE COMMUNICATION AND SCREEN DISPLAY METHOD PERFORMED BY SUCH DEVICE

(75) Inventors: Toshihiro Hishida, Kobe (JP); Masakazu Kawano, Habikino (JP); Hidehiko Shin, Moriguchi (JP); Junji Ishigaki, Hachioji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/566,812

(22) Filed: May 8, 2000

(30) Foreign Application Priority Data

May 13, 1999 (JP) ............................................ 11-132253

(51) Int. Cl.⁷ .............................. G09G 5/00; H04B 1/38
(52) U.S. Cl. ......................... 345/684; 345/784; 455/566
(58) Field of Search ................................ 345/684, 686, 345/690, 784; 455/566

(56) References Cited

U.S. PATENT DOCUMENTS

| | | | | |
|---|---|---|---|---|
| 4,922,238 A | * | 5/1990 | Aoki et al. ................. | 345/590 |
| 5,615,384 A | | 3/1997 | Allard et al. ............... | 345/811 |
| 5,801,691 A | | 9/1998 | Dahl .......................... | 345/746 |
| 6,072,487 A | * | 6/2000 | Kakuta et al. .............. | 345/684 |
| 6,091,956 A | * | 7/2000 | Hollenberg ................. | 455/456 |
| 6,249,689 B1 | * | 6/2001 | Aizawa ...................... | 607/3 |
| 6,389,301 B1 | * | 5/2002 | Furuya ....................... | 455/412 |

FOREIGN PATENT DOCUMENTS

EP 0 889 402 1/1999

OTHER PUBLICATIONS

IBM Technical Disclosure Bulletin, TDB–ACC–NO: NB9003344, Mar. 1990, vol. No.: 32, pp. 344–345*

* cited by examiner

Primary Examiner—Matthew C. Bella
Assistant Examiner—A Blackman
(74) Attorney, Agent, or Firm—Wenderoth, Lind & Ponack, L.L.P.

(57) ABSTRACT

A terminal device for mobile communication and a screen display method are provided for appropriately correcting the amount of scrolling so that a display element should not be displayed across the boundary of a display screen when the screen with a plurality of display elements of different types mixed therein is scrolled. A scroll instruction unit outputs a scroll instruction such as one-line vertical scrolling based on the operation inputted by a user through an input unit. A basic amount determination unit determines a basic moving amount according to the scroll instruction. A display element searching unit calculates a provisional display start position based on the basic moving amount and a display start position held in a display element information holding unit, and searches for a display element that is supposed to be displayed across the boundary of the display screen. An offset determination unit determines one of the display elements as a reference display element based on priority information, and calculates an offset moving amount. A calculation unit calculates an actual moving amount on the display screen by adding the offset moving amount to the basic moving amount.

32 Claims, 14 Drawing Sheets

FIG. 3

```
<HTML>
<HEAD>
<TITLE>sample1</TITLE>
</HEAD>
<BODY>
<IMG src="image1.gif"><BR>        ELEMENT ID:0001
<B>A B C</B>                       ELEMENT ID:0002
<HR width=50 size=3 align=left>    ELEMENT ID:0003
<FORM ACTION="cgi-bin/post-query" METHOD="POST">
<INPUT type="submit" value="SEND">  ELEMENT ID:0004
        ...
</HTML>
```

FIG. 4

|  | X COORDINATE | Y COORDINATE |
|---|---|---|
| DISPLAY START POSITION COORDINATES | 0 | 0 |

| ELEMENT ID | TYPE | X | Y | WIDTH | HEIGHT | CONTENT |
|---|---|---|---|---|---|---|
| 0001 | BMP | 0 | 0 | 30 | 50 | BMP BODY |
| 0002 | TEXT | 0 | 50 | 48 | 15 | "ABC" |
| 0003 | LINE | 0 | 65 | 50 | 5 | NONE |
| 0004 | COMPOUND 1 | 0 | 70 | 40 | 20 | "SEND" + OVAL |
| ⋮ | ⋮ | ⋮ | ⋮ | ⋮ | ⋮ | ⋮ |

[UNIT: DOT]

FIG. 7

| SCROLL INSTRUCTION | MOVING AMOUNT |
|---|---|
| UPWARD/DOWNWARD SCROLLING A LINE | 1 5 DOTS |
| UPWARD/DOWNWARD SCROLLING A PAGE | 1 2 0 DOTS |

FIG. 8

| DISPLAY ELEMENT | PRIORITY | REFERENCE VALUE | CORRECTION PRIORITY AREA | |
|---|---|---|---|---|
| | | | DOWNWARD SCROLLING | UPWARD SCROLLING |
| TEXT | 2 | 1 4 DOTS | ON-SCREEN | OFFSCREEN |
| LINE | 3 | 1 4 DOTS | ON-SCREEN | OFFSCREEN |
| COMPOSITE 1 | 1 | 1 9 DOTS | ON-SCREEN | OFFSCREEN |

FIG. 10

|  | X COORDINATE | Y COORDINATE |
|---|---|---|
| DISPLAY START POSITION COORDINATES | 0 | 0 |

| ELEMENT ID | TYPE | X | Y | WIDTH | HEIGHT | CONTENT |
|---|---|---|---|---|---|---|
| 0001 | TEXT | 0 | 0 | 48 | 20 | "TEXT" |
| 0002 | LINE | 0 | 20 | 50 | 5 | NONE |
| 0003 | BMP | 0 | 25 | 50 | 45 | BMP BODY |
| 0004 | COMPOUND 1 | 0 | 70 | 40 | 20 | "SEND" + OVAL |
| ⋮ | ⋮ | ⋮ | ⋮ | ⋮ | ⋮ | ⋮ |

(a) LAYOUT INFORMATION BEFORE SCROLLING

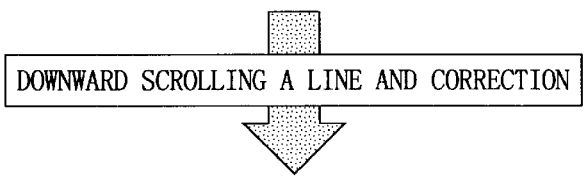

DOWNWARD SCROLLING A LINE AND CORRECTION

|  | X COORDINATE | Y COORDINATE |
|---|---|---|
| DISPLAY START POSITION COORDINATES | 0 | 20 |

| ELEMENT ID | TYPE | X | Y | WIDTH | HEIGHT | CONTENT |
|---|---|---|---|---|---|---|
| 0001 | TEXT | 0 | 0 | 48 | 20 | "TEXT" |
| 0002 | LINE | 0 | 20 | 50 | 5 | NONE |
| 0003 | BMP | 0 | 25 | 50 | 45 | BMP BODY |
| 0004 | COMPOUND 1 | 0 | 70 | 40 | 20 | "SEND" + OVAL |
| ⋮ | ⋮ | ⋮ | ⋮ | ⋮ | ⋮ | ⋮ |

(b) LAYOUT INFORMATION AFTER SCROLLING

FIG. 12

|  | X COORDINATE | Y COORDINATE |
|---|---|---|
| DISPLAY START POSITION COORDINATES | 0 | 6 0 |

| ELEMENT ID | TYPE | X | Y | WIDTH | HEIGHT | CONTENT |
|---|---|---|---|---|---|---|
| 0 0 0 1 | TEXT | 0 | 0 | 4 8 | 2 0 | "TEXT" |
| 0 0 0 2 | LINE | 0 | 2 0 | 5 0 | 5 | NONE |
| 0 0 0 3 | COMPOUND 1 | 0 | 2 5 | 4 0 | 2 5 | "SEND" + OVAL |
| 0 0 0 4 | B M P | 0 | 5 0 | 5 0 | 4 5 | BMP BODY |
| ⋮ | ⋮ | ⋮ | ⋮ | ⋮ | ⋮ | ⋮ |

(a) LAYOUT INFORMATION BEFORE SCROLLING

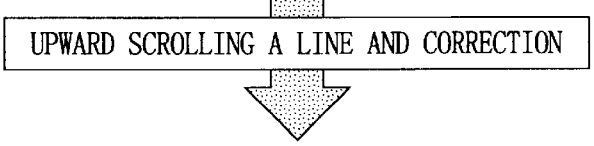

UPWARD SCROLLING A LINE AND CORRECTION

|  | X COORDINATE | Y COORDINATE |
|---|---|---|
| DISPLAY START POSITION COORDINATES | 0 | 5 0 |

| ELEMENT ID | TYPE | X | Y | WIDTH | HEIGHT | CONTENT |
|---|---|---|---|---|---|---|
| 0 0 0 1 | TEXT | 0 | 0 | 4 8 | 2 0 | "TEXT" |
| 0 0 0 2 | LINE | 0 | 2 0 | 5 0 | 5 | NONE |
| 0 0 0 3 | COMPOUND 1 | 0 | 2 5 | 4 0 | 2 5 | "SEND" + OVAL |
| 0 0 0 4 | B M P | 0 | 5 0 | 5 0 | 4 5 | BMP BODY |
| ⋮ | ⋮ | ⋮ | ⋮ | ⋮ | ⋮ | ⋮ |

(b) LAYOUT INFORMATION AFTER SCROLLING

FIG. 14

|  | X COORDINATE | Y COORDINATE |
|---|---|---|
| DISPLAY START POSITION COORDINATES | 0 | 40 |

| ELEMENT ID | TYPE | X | Y | WIDTH | HEIGHT | CONTENT |
|---|---|---|---|---|---|---|
| 0001 | BMP | 0 | 0 | 50 | 45 | BMP BODY |
| 0002 | TEXT | 0 | 45 | 48 | 20 | "TEXT" |
| 0003 | COMPOUND 1 | 50 | 45 | 40 | 25 | "SEND" + OVAL |
| 0004 | LINE | 0 | 70 | 50 | 5 | NONE |
| ⋮ | ⋮ | ⋮ | ⋮ | ⋮ | ⋮ | ⋮ |

(a) LAYOUT INFORMATION BEFORE SCROLLING

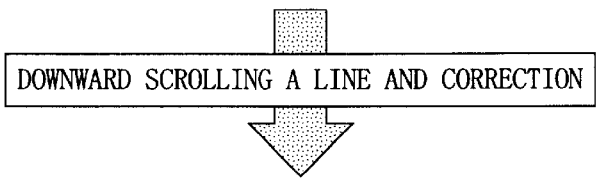

DOWNWARD SCROLLING A LINE AND CORRECTION

|  | X COORDINATE | Y COORDINATE |
|---|---|---|
| DISPLAY START POSITION COORDINATES | 0 | 70 |

| ELEMENT ID | TYPE | X | Y | WIDTH | HEIGHT | CONTENT |
|---|---|---|---|---|---|---|
| 0001 | BMP | 0 | 0 | 50 | 45 | BMP BODY |
| 0002 | TEXT | 0 | 45 | 48 | 20 | "TEXT" |
| 0003 | COMPOUND 1 | 50 | 45 | 40 | 25 | "SEND" + OVAL |
| 0004 | LINE | 0 | 70 | 50 | 5 | NONE |
| ⋮ | ⋮ | ⋮ | ⋮ | ⋮ | ⋮ | ⋮ |

(b) LAYOUT INFORMATION AFTER SCROLLING

TERMINAL DEVICE FOR MOBILE COMMUNICATION AND SCREEN DISPLAY METHOD PERFORMED BY SUCH DEVICE

BACKGROUND OF THE INVENTION

1. Field of the Invention

This invention relates to terminal devices for mobile communication and screen display methods performed by such devices and, more specifically, to a terminal device for mobile communication to carry out data communications with an external server through a digital network and to appropriately scroll a display element such as a character and image on a display screen included in the device, and a screen display method performed by such device.

2. Description of the Background Art

In recent years, with the widespread use of the Internet, documents written in description language such as HTML (Hypertext Markup Language) have been exchanged. As well known, such description language allows free arrangement of a plurality of display elements such as characters and images composing a document.

The HTML is standardized by W3C (World Wide Web Consortium) and standardization of HTML Ver. 4.0 has been complete. The details on the HTML are disclosed in http://www.w3c.org/.

In general, a document written in such description language is displayed or scrolled by using a document processing software called Web browser. Such Web browser is also incorporated in personal portable terminals such as PDAs (Personal Digital Assistants) having communication functions and cellular phones to allow wireless access to the Internet. Therefore, irrespective of wired or wireless, Internet access has become active for a wide variety of purposes such as exchanging electronic mails.

The display screen of the personal portable terminals is so small for the purpose of portability that only a limited number of display elements can be displayed. Further, the resolution of the display screen varies according to models. Therefore, to display elements that cannot be displayed on a single screen in such portable terminals, the screen is scrolled a line or page to sequentially display those elements. Therefore, how the scrolled screen is viewable on a limited size of the display screen becomes very important.

For scrolling, a technique of scrolling and displaying a screen based on the size of characters is disclosed in Japanese Patent Laying-Open No. 10-187136 (1998-187136), although this publication is not specifically for personal portable terminals.

The technique disclosed in this publication relates to a document processing device that displays a document with a plurality of characters of different sizes mixed in one line on a display screen for editing and creating. To achieve such device, the document processing device includes at least a cursor to be displayed for specifying a position (line) of a desired character displayed on the display screen, a move instructing unit instructing movement one line upward or downward from the line where the cursor is located, and a scroll unit scrolling up or down the display screen according to an amount of movement based on the height of the character if the character to be displayed after cursor movement is supposed to be displayed across a boundary of the display screen. With these components, the technique disclosed in the publication allows scrolling so that the displayed characters will not be interrupted on the boundary of the display screen.

As described above, the display screen of the personal portable terminal is so small that display elements that can be displayed at a time are limited. On the other hand, a plurality of display element of different types can be freely arranged on HTML documents. Furthermore, these elements on HTML documents can be set so as to be selected by users (such as "execute" and "send").

However, free arrangement of display elements greatly increases the possibility of causing a problem that some of the display elements might be displayed across the boundary of the display screen when the display screen is scrolled up or down a line or page. Therefore, the number of display elements that can be recognized in their entirety is reduced, thereby disadvantageously inhibiting recognizable display elements from being displayed on a single screen. Another disadvantage is that users may have to select a selectable display element without recognizing it in its entirety.

The above problems cannot be solved even with the technique disclosed in the above publication as long as a plurality of display elements of different types can be freely arranged.

SUMMARY OF THE INVENTION

Therefore, an object of the present invention is to provide a terminal device for mobile communication that, when scrolling a display screen of a document which a plurality of display elements of different types are mixed, searches for a display element that is supposed to be displayed across the boundary of a display screen and appropriately corrects the amount of scrolling so that the display element is not across the boundary, and a screen display method performed by such device. Therefore, it is possible to increase the number of display elements that can be recognized in their entirety by users on the display screen, select a selectable display element while being recognized in its entirety by the users, and further provide more recognizable information to the user.

The present invention has the following features to solve the object above.

A first aspect of the present invention is directed to a terminal device for mobile communication enabling data communication with an external server through a digital network and displaying a document composed of display elements of different types such as characters and images. The terminal device comprises a reception unit operable to receive a scroll instruction for scrolling a display screen from a user, a basic amount determination unit, responsive to the scroll instruction from the reception unit, operable to determine a basic moving amount according to the scroll instruction, a display element information holding unit operable to hold information required for displaying the display elements composing the document, a display element searching unit operable to search the display elements for a reference display element that is supposed to be displayed across a boundary of the display screen if the display screen is scrolled based on the basic moving amount determined by the basic-amount determination unit, by using the information held by the display element information holding unit, an offset determination unit, operable to calculate an offset moving amount based on the reference display element found by the display element searching unit, a calculation unit operable to calculate an actual moving amount from the basic moving amount determined by the basic amount determination unit and the offset moving amount calculated by the offset determination unit, and a display processing unit operable to scroll the display screen according to the actual moving amount calculated by the calculation unit.

As described above, in the first aspect, when a document composed of display elements of different types is scrolled on the display screen, the display element that is supposed to be displayed across the boundary of the screen is searched, and the scrolling amount is corrected so that the display element should not be displayed across the boundary. Therefore, it is possible to in crease the number of display elements that can be recognized in their entirety by users on the display screen, select a selectable display element while being recognized in its entirety by the users, and further provide more recognizable information in the users.

According to a second aspect, further to the first aspect discussed above, the offset determination unit previously has priority information indicating priorities of the-display elements that are possibly referred to. If the display element searching unit finds a plurality of display elements that are possibly referred to, the offset determination unit calculates the offset moving amount based on one of the plurality of display elements that is determined as the reference display element according to the priority information.

As described above, in the second aspect, if display elements of different types are supposed to be displayed across the boundary of the screen, the scrolling amount is corrected with reference to the display element having the highest priority to be displayed. Therefore, it is possible to correct scrolling with reference to a compound element that enables a user to perform instructing operation, a text element whose characters should be recognized, and the like, thereby improving operability such as to prevent users from erroneous operation and to enhance element recognition.

According to third and fourth aspects, further to the first and second aspects, respectively, if the display element searching unit finds the display element that is predetermined not to be referred to as the reference display element, the offset determination unit calculates the offset moving amount without considering the display element.

As described above, in the third and fourth aspects, the display element that is predetermined not to be referred to is excluded. Therefore, scroll correction is faster.

According to fifth to eighth aspects that are preferable, further to the first to fourth aspects, respectively, the reception unit receives the scroll instruction for one-line/one-page vertical scrolling, and the basic amount determination unit determines the basic moving amount according to the scroll instruction for the one-line/one-page vertical scrolling.

According to ninth to twelfth aspects that are preferable, further to the fifth to eighth aspects, respectively, the display element searching unit takes an upper side of the display screen (a line between upper-left and upper-right 5 ends) as the boundary.

As described above, in the fifth to twelfth aspects, a typical technique for vertical scrolling is described. Therefore, it is possible to correct scrolling always with reference to the upper side of the screen.

According to thirteenth to sixteenth aspects, further to the ninth to twelfth aspects, respectively, the offset determination unit compares a height of the reference display element on and/or off the display screen with a predetermined reference value, and takes the height equal to or smaller than the reference value as the offset moving amount.

As described above, in the thirteenth to sixteenth aspects, scroll correction is made vertically based on the positional relation between the reference display element and the boundary. Therefore, scroll correction can be varied according to the displayed screen so as to become appropriate most.

A seventeenth aspect is directed to a method of displaying a document composed of display elements of different types such as characters and images using previously provided information required for displaying the display elements. The method comprises receiving a scroll instruction for scrolling a display screen from a user, determining a basic moving amount according to the scroll instruction, searching the display elements for a reference display element that is supposed to be displayed across a boundary of the display screen if the display screen is scrolled based on the basic moving amount, by using the information, calculating an offset moving amount based on the reference display element found in the searching step, calculating an actual moving amount from the basic moving amount and the offset moving amount, and scrolling the display screen according to the actual moving amount.

According to an eighteenth aspect, further to the seventeenth aspect, priority information indicating priorities of the display elements that are possibly referred to is previously provided, and if a plurality of display elements that are possibly referred to are found in the searching step, the offset moving amount is calculated in the offset moving amount calculating step based on one of the plurality of display elements that is determined as the reference display element according to the priority information.

According to nineteenth and twentieth aspects, further to the seventeenth and eighteenth aspects, respectively, if the display element that is predetermined not to be referred to as the reference display element is found in the searching step, the offset moving amount is calculated in the offset moving amount calculating step without considering the display element.

According to twenty-first to twenty-fourth aspects that are preferable, further to the seventeenth to twentieth aspects, respectively, in the instructing step, the scroll instruction for one-line/one-page vertical scrolling is received, and in the determining step, the basic moving amount is determined according to the scroll instruction for one-line/one-page vertical scrolling.

According to twenty-fifth to twenty-eighth aspects that are preferable, further to the twenty-first to twenty-fourth aspects, respectively, in the searching step, an upper side of the display screen (a line between upper-left and upper-right ends) is taken as the boundary.

According to twenty-ninth to thirty-second aspects, further to the twenty-fifth to twenty-eighth aspects, respectively, in the offset moving amount calculating step, a height of the reference display element on and/or off the display screen is compared with a predetermined reference value, and the height equal to or smaller than the reference value is taken as the offset moving amount.

As described above, in the seventeenth to thirty-second aspects, a screen display method performed by the terminal device for mobile communication in the first to sixteenth aspects is described. Applying this method to various terminal devices for mobile communication can produce useful effects as described above.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows one example of data received through an external digital network by a receiving unit 100;

FIG. 4 is a table conceptually showing one example of layout information generated and held by a display element information holding unit 105 based on the data shown in FIG. 3;

FIG. 7 is a table conceptually showing one example of moving amount information held in advance by a basic amount determination 104;

FIG. 8 is a table conceptually showing one example of scroll correction information held in advance by an offset determination 107;

FIG. 10 shows tables conceptually illustrating layout information held by the display element information holding unit in a first specific example;

FIG. 12 shows tables conceptually illustrating layout information held by the display element information holding unit 105 in a second specific example;

FIG. 14 shows tables conceptually illustrating layout information held by the display element information holding unit 105 in a third specific example.

DESCRIPTION OF THE PREFERRED EMBODIMENT

Figure 1:
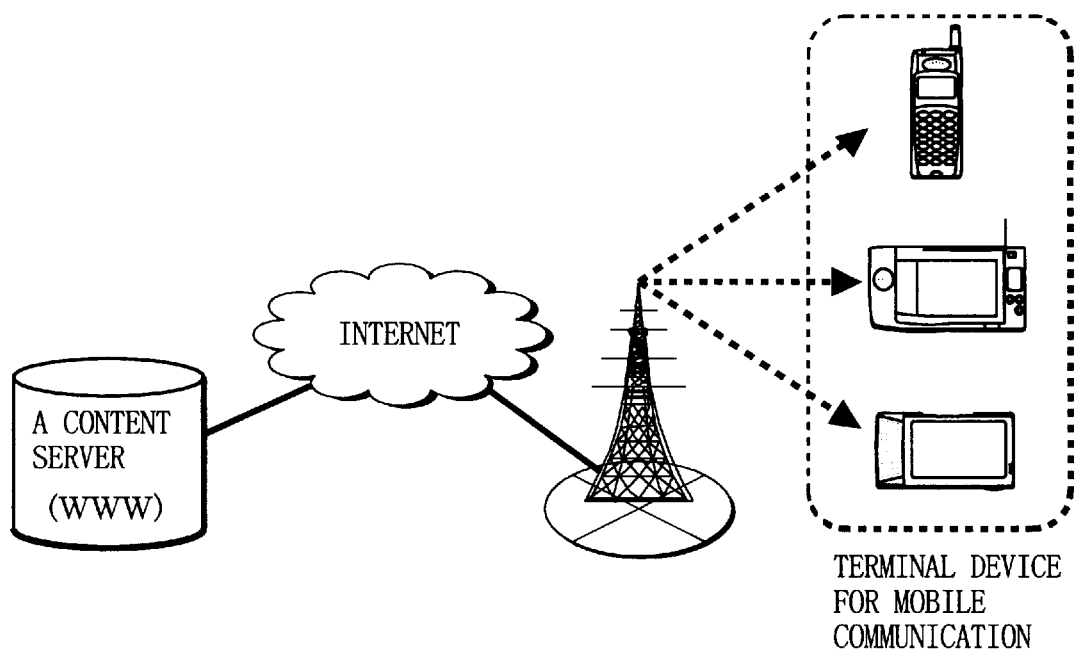
FIG. 1 illustrates a system configuration of a typical network environment in which a terminal device for mobile communication of the present invention is used.

FIG. 1 illustrates a system configuration of a typical network environment in which a terminal device for mobile communication of the present invention is used. As shown in FIG. 1, the terminal device of the present invention is for use mainly in data communication with an external content server (such as WWW) through a digital network such as the Internet.

The configuration and operation of the terminal device of the present invention that can be used in the above system configuration is now described in detail with reference to FIGS. 2 to 15.

First, a basic screen displaying operation performed by the terminal device according to one embodiment of the present invention is described below by referring to FIGS. 2 to 5.

Figure 2:
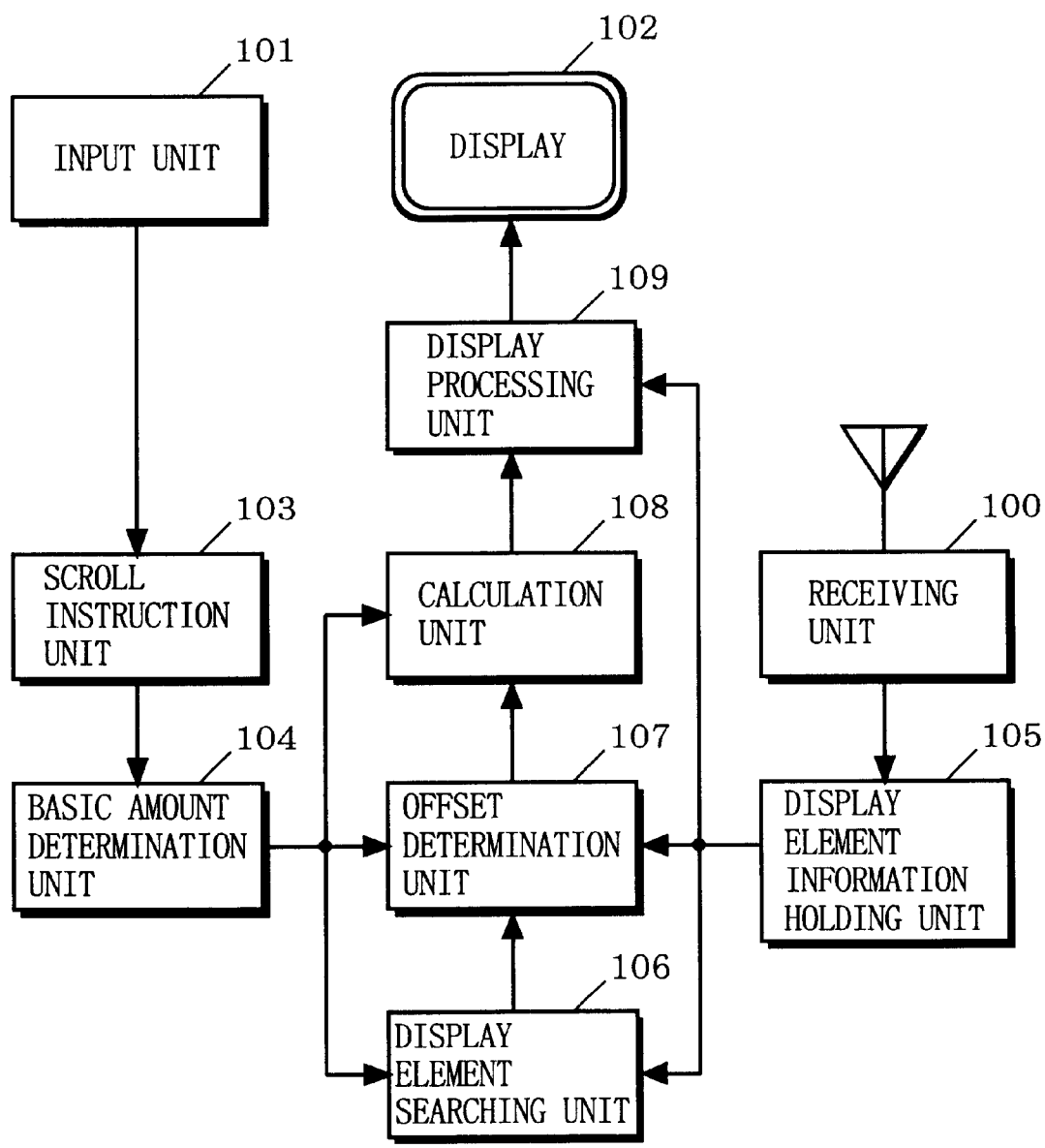
FIG. 2 is a block diagram showing the configuration of the terminal device according to one embodiment of the present invention.

FIG. 2 is a block diagram showing the configuration of the terminal device according to the embodiment of the present invention. In FIG. 2, the terminal device includes a receiving unit 100, an input unit 101, a display 102, a scroll instruction unit 103, a basic amount determination unit 104, a display element information holding unit 105, a display element searching unit 106, an offset determination unit 107, a calculation unit 108, and a display processing unit 109.

Figure 5:
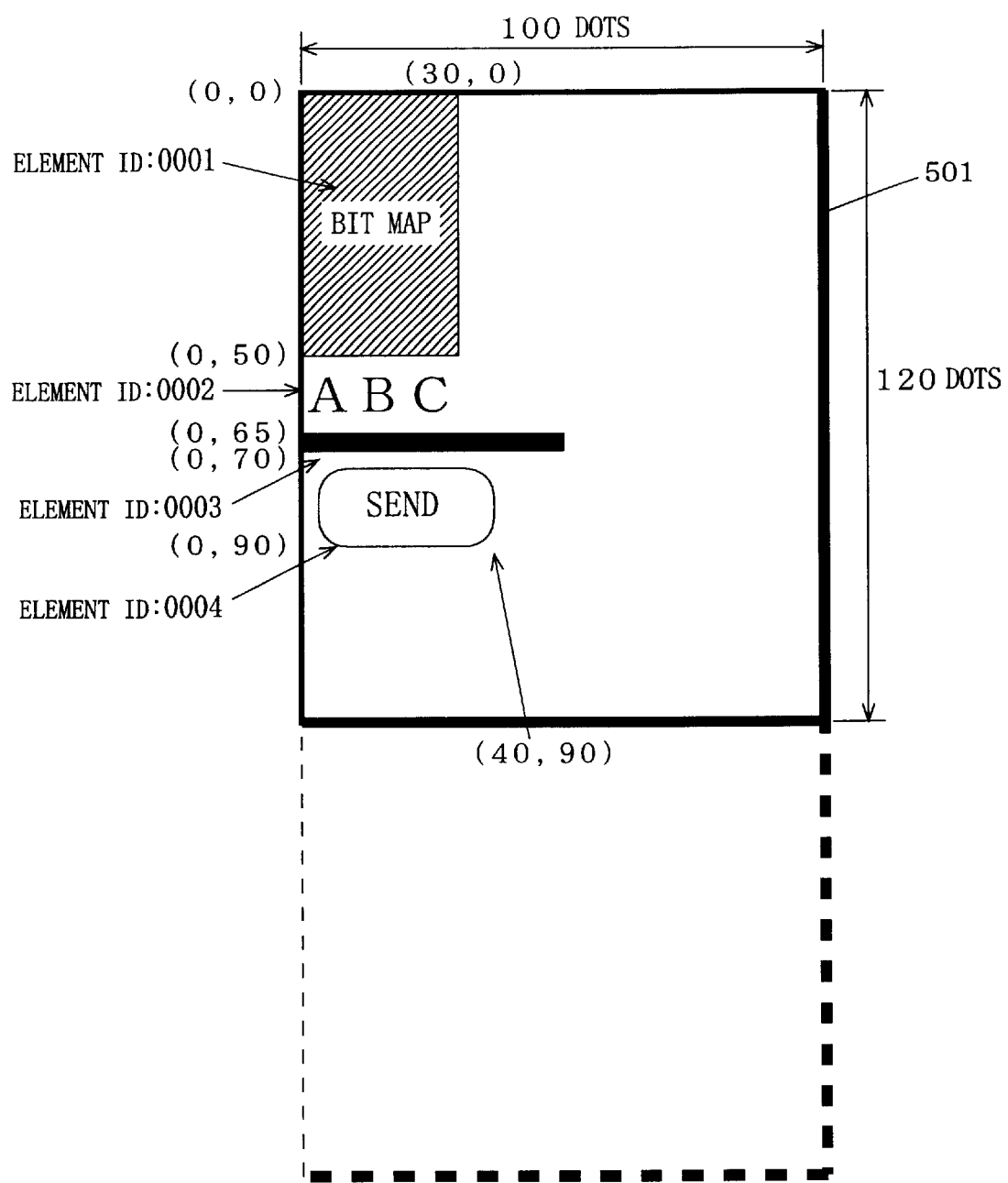
FIG. 5 shows one example of an image displayed on a display 102 according to the layout information shown in FIG. 4.

FIG. 3 shows one example of data received through an external digital network by the receiving unit 100. FIG. 4 is a table conceptually showing one example of layout information generated and held by the display element information holding unit 105 based on the data shown in FIG. 3. FIG. 5 shows one example of an image displayed on the display 102 according to the layout information shown in FIG. 4.

The receiving unit 100 receives data such as an HTML document file through the external digital network, and provides the data to the display element information holding unit 105.

The display element information holding unit 105 analyzes the data provided by the receiving unit 100 with a predetermined technique (provided by a browser in use), generates layout information required for screen display on the display 102, and then holds the information therein. For example, if the data is an HTML document file as shown in FIG. 3, the display element information holding unit 105 analyzes the data, generates layout information of each display element in conceptual form as shown in FIG. 4, and then holds the generated information therein. Note that the display element information holding unit 105 also holds layout information for data previously stored in the device such as display data for setting functions.

In FIG. 4, display start position coordinates represent one dot position for all display elements being displayed that is located on the display screen and appears on the upper-left corner of the screen. In the display state of FIG. 5, X and Y coordinates are both 0 dot. Further, a display element represented by Element ID "0001" is a bit map (BMP) element whose upper-left dot is specified by X and Y coordinates (0, 0), having a width of 30 dots and a height of 50 dots, and its content is a data string of a bit map body. A display element represented by Element ID "0002" is a text element whose upper-left dot is specified by X and Y coordinates (0, 50), having a width of 48 dots and a height of 15 dots, and its content is a character sting "ABC". A display element represented by Element ID "0003" is a line element whose upper-left dot is specified by X and Y coordinates (0, 65), having a width of 50 dots and a height of 5 dots. A display element represented by Element ID "0004" is a compound-1 element (consisting of two or more different display elements) whose upper-left dot is specified by X and Y coordinates (0, 70), having a width of 40 dots and a height of 20 dots, and its content is combined data of a character string "send" and an oval line.

The display processing unit 109 performs scroll correction, which will be described later. Then, referring to the layout information held in the display element information holding unit 105, the display processing unit 109 generates display data of the display element to be displayed on the screen of the display 102 with reference to the display start position coordinates, then outputs the display data to the display 102.

FIG. 5 shows the image displayed on the screen of the display 102 according to the layout information shown in FIG. 4. A screen 501 in FIG. 5 is a display screen of 100×120 dots, for example, on the display 102.

Described next is screen display operation for scrolling performed by the terminal device according to the present embodiment further referring to FIGS. 6 to 9.

Figure 6:
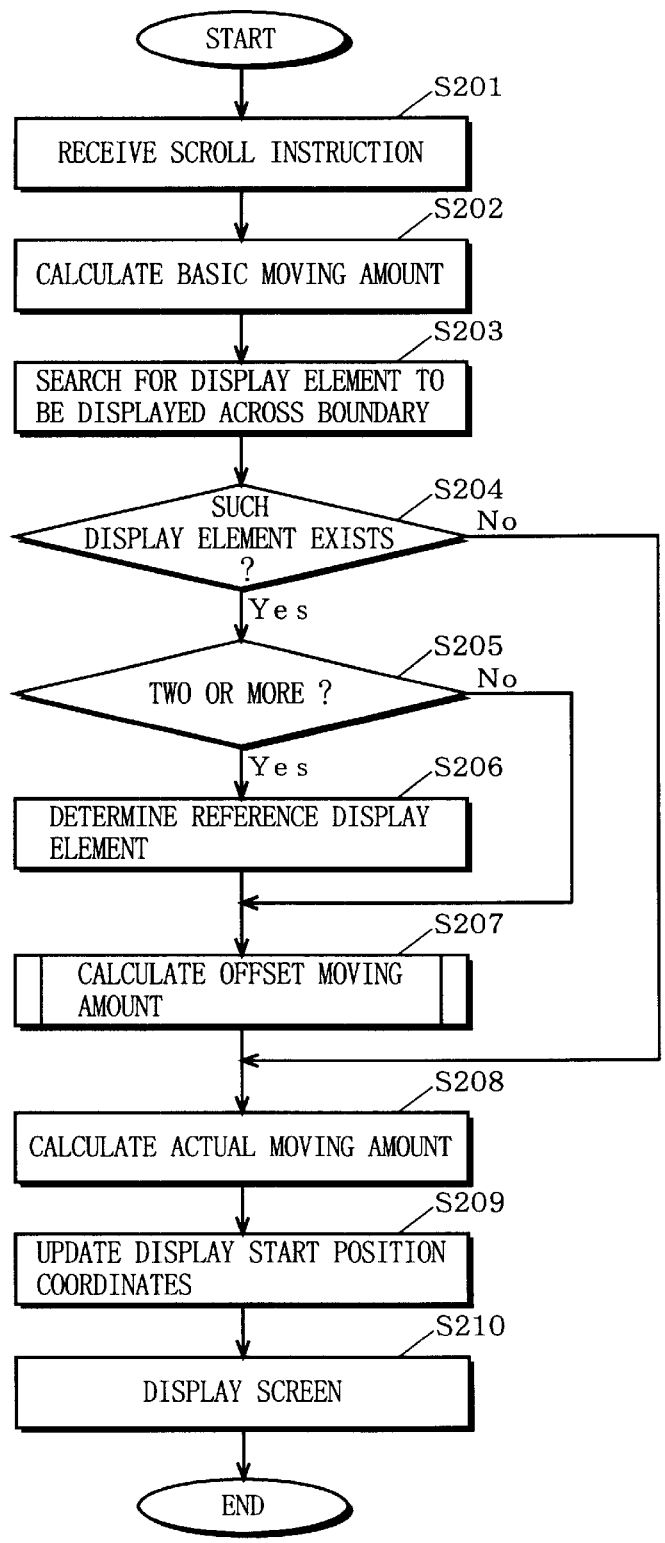
FIG. 6 is a flow chart showing a screen display operation for scrolling performed by the terminal device according to the embodiment of the present invention.
Figure 9:
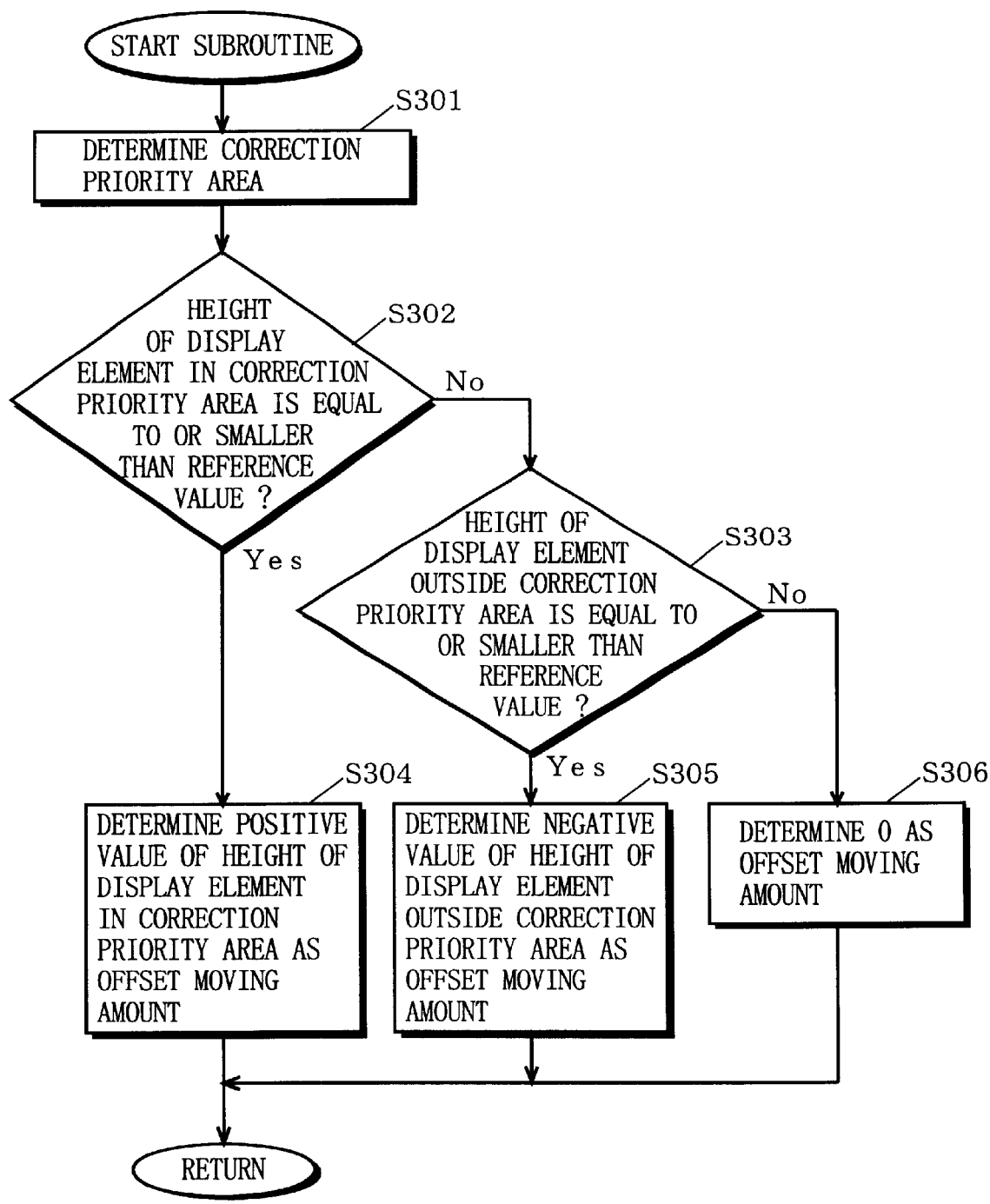
FIG. 9 is a flow chart showing a subroutine step of calculating an offset moving amount performed by the offset determination unit 107.

FIG. 6 is a flow chart showing the screen display operation for scrolling performed by the terminal device according to the embodiment of the present invention. FIG. 7 is a table conceptually showing one example of moving amount information held in advance by the basic amount determination unit 104. FIG. 8 is a table conceptually showing one example of scroll correction information held in advance by the offset determination unit 107. FIG. 9 is a flow chart showing a subroutine step of calculating an offset moving amount performed by the offset determination unit 107 in step S207 of FIG. 6.

The input unit 101 is exemplarily implemented by an input button, transferring input operation by the user to the scroll instruction unit 103.

Based on the operation transferred from the input unit 101, the scroll instruction unit 103 outputs a scroll instruction of scrolling up or down a line (hereinafter collectively referred to as one-line vertical scrolling) or scrolling up or down a page (hereinafter collectively referred to as one-page vertical scrolling) to the basic amount determination unit 104 (step S201).

The basic amount determination unit 104 determines the moving direction and moving amount according to the scroll instruction provided by the scroll instruction unit 103 (step S202). The basic amount determination unit 104 determines the moving amount using moving amount information (FIG. 7) held in advance therein. By way of example, in FIG. 7, the basic amount determination unit 104 determines the moving amount as "15 dots" if the scroll instruction is one-line vertical scrolling, while "120 dots" if the instruction is one-page vertical scrolling. Note that this moving amount information can be arbitrarily set based on the screen size of the display 102 included in the terminal device, and the like. The moving direction and moving amount determined by the basic amount determination unit 104 (hereinafter collectively referred to as basic moving amount) is provided to the display element searching unit 106, the offset determination unit 107, and the actual moving amount calculation unit 108.

The display element searching unit 106 first calculates provisional display start position coordinates after movement of the display screen based on the basic moving amount provided by the basic amount determination unit 104 and the display start position coordinates held in the display element information holding unit 105. The display element searching unit 106 then searches the layout information held in the display element information holding unit 105 for the display element that is supposed to be displayed across a predetermined boundary of the display screen if display is made based on the calculated provisional display start position coordinates (step S203). In the present embodiment, the boundary is taken as the upper side of the display screen (a line between the upper-left and upper-right ends).

The offset determination unit 107 first determines whether there is any display element to be displayed across the boundary of the display screen, based on the results in the display element searching unit 106 (step S204). If such display element exists, the offset determination unit 107 further determines whether the number of such elements is one, or two or more (step S205). When determining in step S205 that two or more display elements exist, the offset determination unit 107 determines one of the display elements as a display element to be referred to for scroll correction (hereinafter referred to as reference display element) based on the priority included in scroll correction information held in advance therein (step S206).

Here, the scroll correction information held in advance in the offset determination unit 107 is as such shown in FIG. 8. In the scroll correction information, priority information, correction reference value (hereinafter simply referred to as reference value), and correction priority area are provided for each display element that can be referred to for scroll correction. Priority information is used for determining the reference display element among a plurality of display elements that are supposed to be displayed across the boundary of the display screen. The priority information can be arbitrarily determined according to the specifications and objects of the terminal. In FIG. 8, the composite 1 element which enables the user to perform instructing operation is given highest priority, then the text element whose characters should be recognized, and then the line element. This priority order is determined in order to improve operability, that is, to prevent users from erroneous operation and to enhance element recognition. The reference value is determined in advance based on the moving amount information shown in FIG. 7 and the maximum height of each display element (such height is previously set in the terminal device), and used for calculating the offset moving amount, which will be described later. This reference value is preferably less than the moving amount of one-line vertical scrolling, and equal to or larger than half of the maximum height of the display element. The correction priority area is used for determining the direction for correction.

Note that, if a plurality of different display elements of the same type exist (for example, two text elements with different heights), each element may be provided with different scroll correction information. Furthermore, in FIG. 8, although not being referred to for correction, the bit map element that is low in height excluding background may be provided with scroll correction information for correction.

After determining the reference display element, the offset determination unit 107 calculates the offset moving amount based on the moving direction provided by the basic amount determination unit 104 and the reference value and correction priority area of the scroll correction information (FIG. 8) (step S207), which is now described below with reference to FIGS. 8 and 9.

The offset determination unit 107 determines the correction priority area "on-screen" referring to "downward scrolling" of the correction priority area when the moving direction is "downward", while "off screen" referring to "upward scrolling" when the moving direction is "upward" (step S301). Next, the offset determination unit 107 calculates a height H1 of the reference display element in the determined correction priority area, and determines whether the height H1 is equal to or smaller than a reference value R (H1≦R) (step S302). If it is determined in step S302 that the height H1 is not larger than the reference value R, the offset determination unit 107 determines a positive value of the height H1 (+H1) as the offset moving amount (step S304). On the other hand, if it is determined in step S302 that the height H1 is larger than the reference value R, the offset determination unit 107 calculates a height H2 of the reference display element outside the determined correction priority area ("off screen" if the correction priority area is "on-screen", and vice versa) to further determines whether the height H2 is equal to or smaller than the reference value R (H2≦R) (step S303). If it is determined in step S303 that the height H2 is not larger than the reference value R, the offset determination unit 107 determines a negative value of the height H2 (−H2) as the offset moving amount (step S305). On the other hand, if it is determined in step S303 that the height H2 is larger than the reference value R, the offset determination unit 107 determines the offset moving amount as "0" (step S306).

The calculation unit 108 adds the offset moving amount provided by the offset determination unit 107 to the basic moving amount provided by the basic amount determination unit 104 to calculate the amount of actual moving on the display screen (hereinafter referred to as actual moving amount) (step S208).

The display processing unit 109 updates the current display start position coordinates of the layout information held in the display element information holding unit 105 by adding the actual moving amount calculated by the calculation unit 108 (step S209). The display processing unit 109 then refers to the layout information held in the display element information holding unit 105, generates display data of the display element to be displayed on the screen of the display 102 with reference to the updated display start position coordinates, and then outputs the display data to the display 102 (step S210).

Next, specifically described is screen display operation (method) performed by the terminal device according to the present embodiment with reference to examples shown in FIGS. 10 to 15.

Note that in the following examples, assume that the scroll instruction unit 103 previously holds the moving amount information as shown in FIG. 7. Further, assume that the offset determination unit 107 previously holds the scroll correction information as shown in FIG. 8. Still further, screen display operation in each example is performed from (1) to (6) in sequence.

First Example

Figure 11:
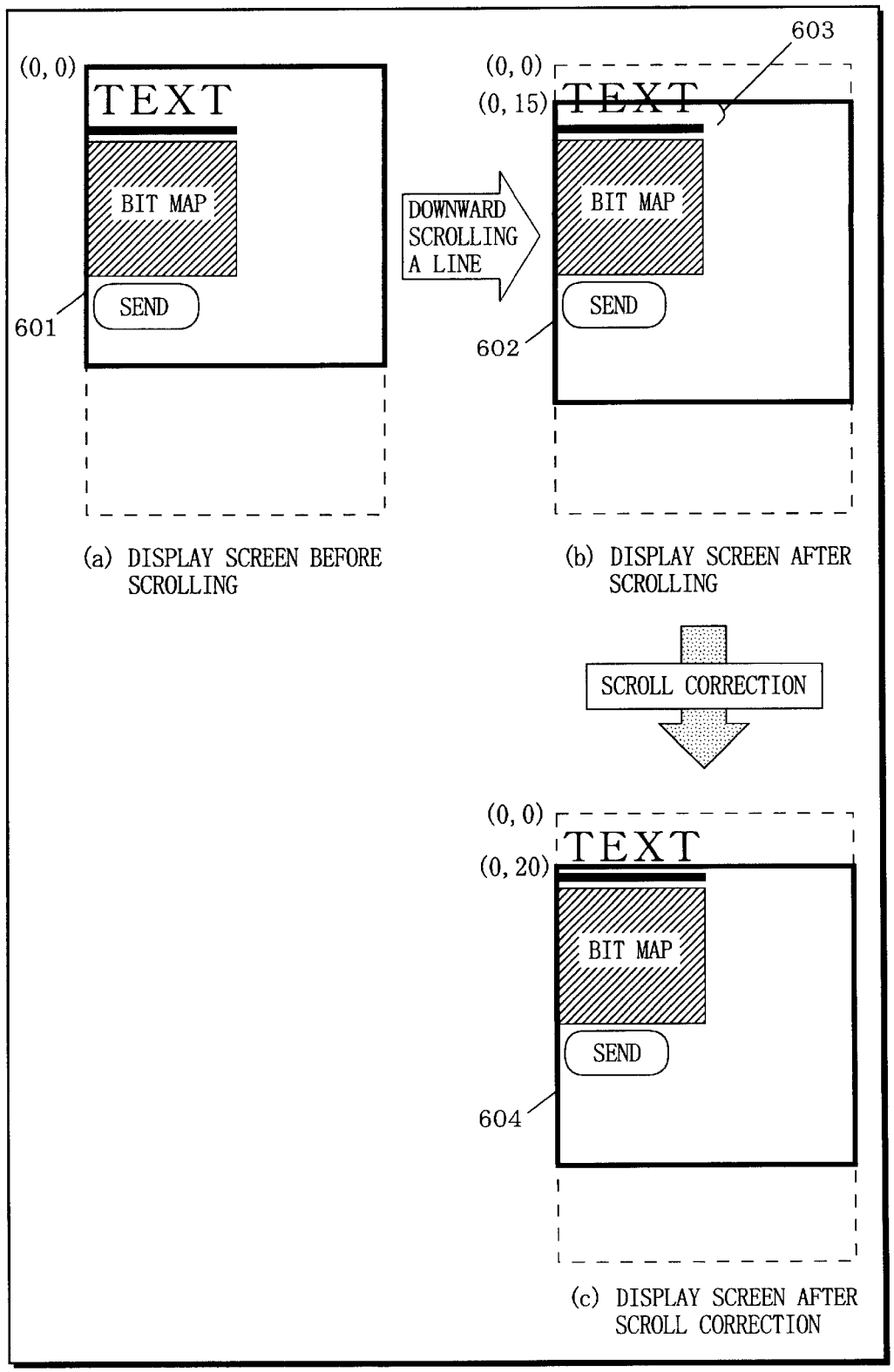
FIG. 11 illustrates images displayed on the display 102 in the first specific example.

In a first example, assume that the layout information as shown in a part indicated by (a) in FIG. 10 is previously held in the display element information holding unit 105. Also assume in the display 102 that an area 601 displayed as shown in a part indicated by (a) in FIG. 11 is to be scrolled up a line.
(1) The basic amount determination unit 104 determines the moving direction "downward" and the moving amount "15 dots" based on FIG. 7, according to the scroll instruction provided by the scroll instruction unit 103.
(2) The display element searching unit 106 calculates the provisional display start position coordinates (0, 15) from the display start position coordinates (0, 0) held in the display element information holding unit 105 according to the determination of the basic amount determination unit 104. If the screen is scrolled to this calculated provisional coordinates, an area 602 shown in a part indicated by (b) in FIG. 11 is supposed to be displayed, but is actually not displayed.
(3) Taking a horizontal line having the calculated provisional Y coordinate of 15 dots (the upper side of the display screen) as the boundary, the display element searching unit 106 searches the display element information held in the display element information holding unit 105 for any display element that is supposed to be displayed across the boundary. Specifically, the display element searching unit 106 determines whether each display element satisfies (Y coordinate of the upper-left corner) <15< (Y coordinate of the upper-left corner+height). In this example, the display element searching unit 106 retrieves one display element, that is, Element ID "0001" as the reference display element.
(4) Since one reference display element (text element) is retrieved, the offset determination unit 107 determines the reference value "14 dots" and the correction priority area "on-screen" based on FIG. 8 according to the determination of the basic amount determination unit 104. The offset determination unit 107 then determines whether a height 603 of Element ID "0001" to be displayed on the screen is equal to or smaller than the reference value (step S302 of FIG. 9). In this example, the height 603 (=5 dots) is smaller than the reference value (=14 dots). Therefore, the offset determination unit 107 determines the offset moving amount as "+5 dots" (step S304 of FIG. 9).
(5) According to the calculation result "+5 dots" of the offset determination unit 107, and the determination "downward" and "15 dots" of the basic amount determination unit 104, the calculation unit 108 determines the actual moving amount as 20 (=15+5) dots downward.
(6) Based on the calculation result "20 dots, downward", the display processing unit 109 updates the display start position coordinates held by display element information holding unit 105 to (0, 20), as shown in a part indicated by (b) in FIG. 10, generating and then displaying display data to be displayed on the display 102. An area 604 displayed on the display 102 after the screen is scrolled according to the updated layout information is shown in a part indicated by (c) in FIG. 11.

Second Example

Figure 13:
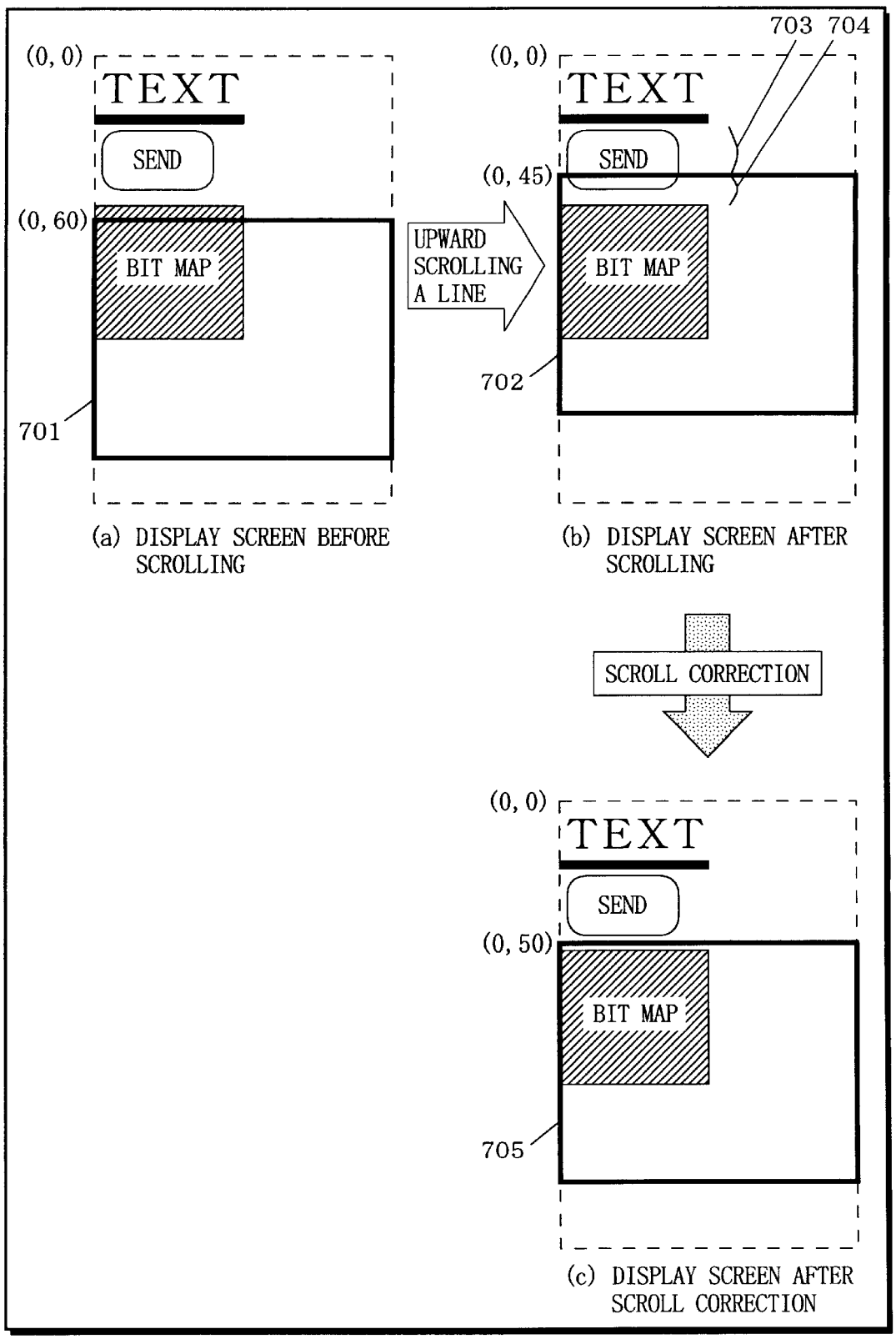
FIG. 13 illustrates images displayed on the display 102 in the second specific example.

In a second example, assume that the layout information as shown in a part indicated by (a) in FIG. 12 is previously held in the display element information holding unit 105. Also assume in the display 102 that an area 701 displayed as shown in a part indicated by (a) in FIG. 13 is to be scrolled down a line.
(1) The basic amount determination unit 104 determines the moving direction "upward" and the moving amount "15 dots" based on FIG. 7, according to the scroll instruction provided by the scroll instruction unit 103.
(2) The display element searching unit 106 calculates the provisional display start position coordinates (0, 45) from the display start position coordinates (0, 60) held in the display element information holding unit 105 according to the determination of the basic amount determination unit 104. If the screen is scrolled to this calculated provisional coordinates, an area 702 shown in a part indicated by (b) in FIG. 13 is supposed to be displayed, but is actually not displayed.
(3) Taking a horizontal line having the calculated provisional Y coordinate of 45 dots (the upper side of the display screen) as the boundary, the display element searching unit 106 searches the display element information held in the display element information holding unit 105 for any display element to be displayed across the boundary. Specifically, the display element searching unit 106 determines whether each display element satisfies (Y coordinate of the upper-left corner)<45<(Y coordinate of the upper-left corner+height). In this example, the display element searching unit 106 retrieves one display element, that is, Element ID "0003" as the reference display element.
(4) Since one reference display element (compound-1 element) is retrieved, the offset determination unit 107 determines the reference value "19 dots" and the correction priority area "off screen" based on FIG. 8 according to the determination of the basic amount determination unit 104. The offset determination unit 107 then determines whether a height 703 of Element ID "0003" to be displayed off the screen is equal to or smaller than the reference value (step S302 of FIG. 9). In this example, the height 703 (=20 dots) is larger than the reference value (=19 dots). Therefore, the offset determination unit 107 further determines whether a height 704 of Element ID "0003" to be displayed on the screen is equal to or smaller than the reference value (step S303 of FIG. 9). Here, the height 704 (=5 dots) is smaller than the reference value (=19 dots). Therefore, the offset determination unit 107 determines the offset moving amount as "−5 dots" (step S305 of FIG. 9).

(5) According to the calculation result "−5 dots" of the offset determination unit 107, and the determination "upward" and "15 dots" of the basic amount determination unit 104, the calculation unit 108 determines the actual moving amount as 10 (=15−5) dots upward.

(6) Based on the calculation result "10 dots, upward", the display processing unit 109 updates the display start position coordinates held by display element information holding unit 105 to (0, 50), as shown in a part indicated by (b) in FIG. 12, generating and then displaying display data to be displayed on the display 102. An area 705 displayed on the display 102 after the screen is scrolled according to the updated layout information is shown in a part indicated by (c) in FIG. 13.

Third Example

Figure 15:
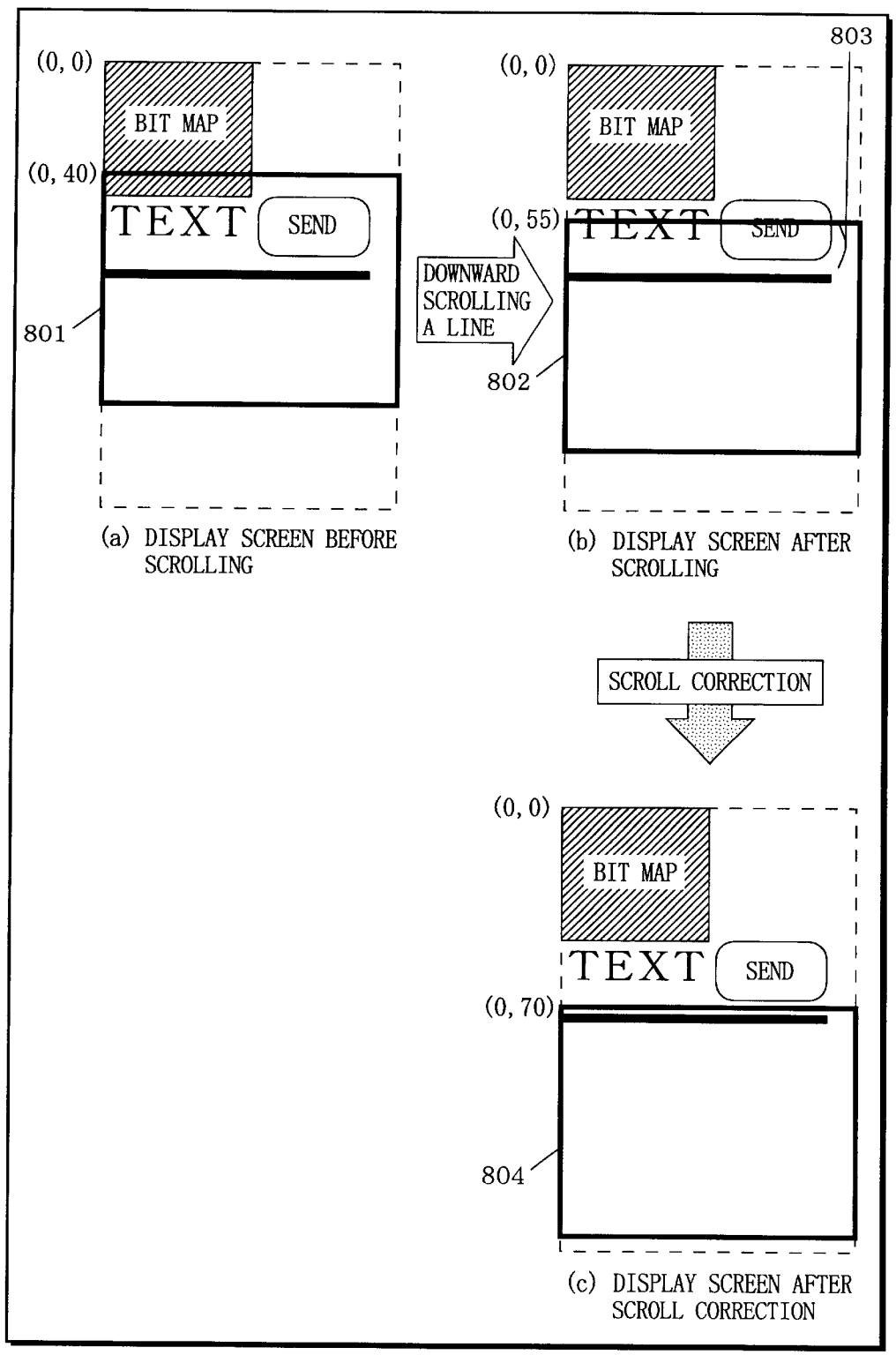
FIG. 15 illustrates images displayed on the display 102 in the third specific example.

In a third example, assume that the layout information as shown in a part indicated by (a) in FIG. 14 is previously held in the display element information holding unit 105. Also assume in the display 102 that an area 801 displayed as shown in a part indicated by (a) in FIG. 15 is to be scrolled up a line.

(1) The basic amount determination unit 104 determines the moving direction "downward" and the moving amount "15 dots" based on FIG. 7, according to the scroll instruction provided by the scroll instruction unit 103.

(2) The display element searching unit 106 calculates the provisional display start position coordinates (0, 55) from the display start position coordinates (0, 40) held in the display element information holding unit 105 according to the determination of the basic amount determination unit 104. If the screen is scrolled to this calculated provisional coordinates, an area 802 shown in a part indicated by (b) in FIG. 15 is supposed to be displayed, but is actually not displayed.

(3) Taking a horizontal line having the calculated provisional Y coordinate of 55 dots (the upper side of the display screen) as the boundary, the display element searching unit 106 searches the display element information held in the display element information holding unit 105 for any display element to be displayed across the boundary. Specifically, the display element searching unit 106 determines whether each display element satisfies (Y coordinate of the upper-left corner)<55<(Y coordinate of the upper-left corner+height). In this example, the display element searching unit 106 retrieves two display elements, that is, Element IDs "0002" and "0003" as possible reference display elements.

(4) Since two display elements are retrieved, the offset determination unit 107 first determines one of these display elements as the reference display element according to the priority information of the scroll correction information (FIG. 8). Here, the display elements retrieved by the display element searching unit 106 are Element ID "0002" of a text element and Element ID "0003" of a composite-i element. Therefore, the offset determination unit 107 determines Element ID "0003" having the highest priority as the reference display element. The offset determination unit 107 then determines the reference value "19 dots" and the correction priority area "on-screen" based on FIG. 8 according to the determination of the basic amount determination unit 104. The offset determination unit 107 then determines whether a height 803 of Element ID "0003" to be displayed on the screen is equal to or smaller than the reference value (step S302 of FIG. 9). In this example, the height 803 (=15 dots) is smaller than the reference value (=19 dots). Therefore, the offset determination unit 107 determines the offset moving amount as "+15 dots" (step S304 of FIG. 9).

(5) According to the calculation result "+15 dots" of the offset determination unit 107, and the determination "downward" and "15 dots" of the basic amount determination unit 104, the calculation unit 108 determines the actual moving amount as 30 (=15+15) dots downward.

(6) Based on the calculation result "30 dots, downward", the display processing unit 109 updates the display start position coordinates held by display element information holding unit 105 to (0, 70), as shown in a part indicated by (b) in FIG. 14, generating and then displaying display data to be displayed on the display 102. An area 804 displayed on the display 102 after the screen is scrolled according to the updated layout information is shown in a part indicated by (c) in FIG. 15.

As described above, according to the terminal device for mobile communication and screen display method of the embodiment of the present invention, when a screen with a plurality of display elements of different types mixed therein is scrolled, a display element that is supposed to be displayed across the boundary of the display screen is retrieved, and the amount of scrolling is corrected so that the display element is not displayed across the boundary. If a plurality of display elements are supposed to be displayed across the boundary, the amount of scrolling is corrected with reference to the display element having the highest priority.

Such scrolling correction can increase the number of display elements that can be recognized in their entirety by users on a display screen, and further enables the users to select a selectable display element while recognizing it in its entirety. Therefore, more recognizable information can be provided for the users through the display screen.

In the above embodiment, text, composite-1, and line elements are exemplarily used as possible reference display element. However, these display elements may not be used by deleting the information about these display elements from the scroll correction information shown in FIG. 8. Also, any display elements of other types may be used by adding information about such display elements to the scroll correction information.

Here, the display element not to be referred to may have no scroll correction information. Alternatively, such display element may have scroll correction information, but may be temporarily inhibited from being used as the reference display element (for example, no priority is provided). In this case, the user can arbitrarily set the reference display element through operation.

Further, in the above embodiment, the display element to be displayed across the boundary of the upper side of the display screen is retrieved as the reference display element. However, searching may be made with reference to the lower side of the display screen (a line between the lower-left and lower-right ends). Also, the boundary may be varied according to the direction of scrolling. For example, the upper side of the display screen is taken as the boundary for upward scrolling, while the lower side for downward scrolling.

Still further, although vertical scrolling is described in the above embodiment, the above described principle of the present invention can also be applied to horizontal (rightward and leftward) scrolling. Specifically, in such case, the basic amount determination unit 104 has moving amount information about horizontal scrolling; the offset determination unit 107 has reference values as to horizontal scrolling; and the display element searching unit 106 searches for any display element that is supposed to be displayed across the boundary, that is, the left side (a line between the upper-left and lower-left ends) or right side (a line between the upper-right and lower-right ends) of the display screen, as the reference display element. Such horizontal scrolling may be useful when an image covering a wide range such as a map is to be displayed.

While the invention has been described in detail, the foregoing description is in all aspects illustrative and riot restrictive. It is understood that numerous other modifications and variations can be devised without departing from the scope of the invention.

What is claimed is:

1. A terminal device for mobile communication of data with an external server through a digital network and for displaying a document composed of display elements of different types including characters and images, said terminal device comprising:

a reception unit operable to receive, from a user, a scroll instruction for scrolling the document on a display screen;

a basic amount determination unit, responsive to the scroll instruction from said reception unit, operable to determine a basic moving amount according to the scroll instruction;

a display element information holding unit operable to hold information required for displaying the display elements composing the document;

a display element searching unit operable to search the display elements for a reference display element to be displayed across a boundary of the display screen if the document is scrolled based on the basic moving amount determined by said basic amount determination unit, by using the information held by said display element information holding unit;

an offset determination unit operable to calculate an offset moving amount based on the reference display element found by said display element searching unit;

a calculation unit operable to calculate an actual moving amount from the basic moving amount determined by said basic amount determination unit and the offset moving amount calculated by said offset determination unit; and a display processing unit operable to scroll the document according to the actual moving amount calculated by said calculation unit.

2. The terminal device for mobile communication according to claim 1, wherein said offset determination unit has priority information therein, the priority information indicates priorities of the display elements that are possibly referred to, and wherein said offset determination unit, when the display element searching unit finds a plurality of display elements that are possible referred to, calculates the offset moving amount based on one of the plurality of display elements that is determined as the reference display element according to the priority information.

3. The terminal device for mobile communication according to claim 1, wherein when said display element searching unit finds a display element that is predetermined not to be referred to as the reference display element, said offset determination unit calculates the offset moving amount without considering the display element.

4. The terminal device for mobile communication according to claim 2, wherein when said display element searching unit finds a display element that is predetermined not to be referred to as the reference display element, said offset determination unit calculates the offset moving amount without considering the display element.

5. The terminal device for mobile communication according to claim 1, wherein said reception unit is operable to receive the scroll instruction for one-line/one-page vertical scrolling, and wherein said basic amount determination unit is operable to determine the basic moving amount according to the scroll instruction for one-line/one-page vertical scrolling.

6. The terminal device for mobile communication according to claim 2, wherein said reception unit is operable to receive the scroll instruction for one-line/one-page vertical scrolling, and wherein said basic amount determination unit is operable to determine the basic moving amount according to the scroll instruction for one-line/one-page vertical scrolling.

7. The terminal device for mobile communication according to claim 3, wherein said reception unit is operable to receive the scroll instruction for one-line/one-page vertical scrolling, and wherein said basic amount determination unit is operable to determine the basic moving amount according to the scroll instruction for one-line/one-page vertical scrolling.

8. The terminal device for mobile communication according to claim 4, wherein said reception unit is operable to receive the scroll instruction for one-line/one-page vertical scrolling, and wherein said basic amount determination unit is operable to determine the basic moving amount according to the scroll instruction for one-line/one-page vertical scrolling.

9. The terminal device for mobile communication according to claim 5, wherein said display element searching unit is operable to use an upper side of the display screen as the boundary, and wherein the upper side of the display screen comprises a line between an upper left end of the display screen and an upper right end of the display screen.

10. The terminal device for mobile communication according to claim 6, wherein said display element searching unit is operable to use an upper side of the display screen as the boundary, and wherein the upper side of the display screen comprises a line between an upper left end of the display screen and an upper right end of the display screen.

11. The terminal device for mobile communication according to claim 7, wherein said display element searching unit is operable to use an upper side of the display screen as the boundary, and wherein the upper side of the display screen comprises a line between an upper left end of the display screen and an upper right end of the display screen.

12. The terminal device for mobile communication according to claim 8, wherein said display element searching unit is operable to use an upper side of the display screen as the boundary, and wherein the upper side of the display screen comprises a line between an upper left end of the display screen and an upper right end of the display screen.

13. The terminal device for mobile communication according to claim 9, wherein said offset determination unit is operable to compare a height of the reference display element on and/or off the display screen with a predetermined reference value, and sets the offset moving amount to the height that is equal to or smaller than the reference value.

14. The terminal device for mobile communication according to claim 10, wherein said offset determination unit is operable to compare a height of the reference display element on and/or off the display screen with a predetermined reference value, and sets the offset moving amount to the height that is equal to or smaller than the reference value.

15. The terminal device for mobile communication according to claim 11, wherein said offset determination unit is operable to compare a height of the reference display element on and/or off the display screen with a predetermined reference value, and sets the offset moving amount to the height that is equal to or smaller than the reference value.

16. The terminal device for mobile communication according to claim 12, wherein said offset determination unit is operable to compare a height of the reference display element on and/or off the display screen with a predetermined reference value, and sets the offset moving amount to the height that is equal to or smaller than the reference value.

17. A method of displaying a document composed of display elements of different types such as characters and images using previously provided information required for displaying the display elements, comprising the steps of:

receiving a scroll instruction for scrolling the document in a display screen from a user;

determining a basic moving amount according to the scroll instruction;

searching the display elements for a reference display element that is supposed to be displayed across a boundary of the display screen if the document is scrolled based on the basic moving amount, by using the information;

calculating an offset moving amount based on the reference display element found when said searching the display elements;

calculating an actual moving amount from the basic moving amount and the offset moving amount; and scrolling the document according to the actual moving amount.

18. The screen display method according to claim 17, further comprising:

previously providing priority information that indicates priorities of the display elements that are possibly referred, wherein if a plurality of display elements that are possibly referred to are found when said searching the display elements, said calculating an offset moving amount comprises calculating an offset moving amount based on one of the plurality of display elements that is determined as the reference display element according to the priority information.

19. The screen display method according to claim 17, wherein if the display element that is predetermined not to be referred to as the reference display element is found when said searching the display elements, said calculating an offset moving amount comprises calculating an offset moving amount without considering the display element.

20. The screen display method according to claim 18, wherein if the display element that is predetermined not to be referred to as the reference display element is found when said searching the display elements, said calculating an offset moving amount comprises calculating an offset moving amount without considering the display element.

21. The screen display method according to claim 17, wherein said receiving a scroll instruction comprises receiving scroll instruction for one-line/one-page vertical scrolling, and wherein in said determining a basic moving amount comprises determining a basic moving amount according to the scroll instruction for one-line/one-page vertical scrolling.

22. The screen display method according to claim 18, wherein said receiving a scroll instruction comprises receiving scroll instruction for one-line/one-page vertical scrolling, and wherein in said determining a basic moving amount comprises determining a basic moving amount according to the scroll instruction for one-line/one-page vertical scrolling.

23. The screen display method according to claim 19, wherein said receiving a scroll instruction comprises receiving scroll instruction for one-line/one-page vertical scrolling, and wherein in said determining a basic moving amount comprises determining a basic moving amount according to the scroll instruction for one-line/one-page vertical scrolling.

24. The screen display method according to claim 20, wherein said receiving a scroll instruction comprises receiving scroll instruction for one-line/one-page vertical scrolling, and wherein in said determining a basic moving amount comprises determining a basic moving amount according to the scroll instruction for one-line/one-page vertical scrolling.

25. The screen display method according to claim 21, wherein when said searching the display elements, the boundary comprises an upper side of the display screen, and wherein an upper side of the display screen comprises a line between an upper-left end of the display screen and an upper-right end of the display screen.

26. The screen display method according to claim 22, wherein when said searching the display elements, the boundary comprises an upper side of the display screen, and wherein an upper side of the display screen comprises a line between an upper-left end of the display screen and an upper-right end of the display screen.

27. The screen display method according to claim 23, wherein when said searching the display elements, the boundary comprises an upper side of the display screen, and wherein an upper side of the display screen comprises a line between an upper-left end of the display screen and an upper-right end of the display screen.

28. The screen display method according to claim 24, wherein when said searching the display elements, the boundary comprises an upper side of the display screen, and wherein an upper side of the display screen comprises a line between an upper-left end of the display screen and an upper-right end of the display screen.

29. The screen display method according to claim 25, wherein said calculating an offset moving amount comprises comparing a height of the reference display element on and/or off the display screen with a predetermined reference value and setting the offset moving amount as the height equal to or smaller than the reference value.

30. The screen display method according to claim 26, wherein said calculating an offset moving amount comprises comparing a height of the reference display element on and/or off the display screen with a predetermined reference value and setting the offset moving amount as the height equal to or smaller than the reference value.

31. The screen display method according to claim 27, wherein said calculating an offset moving amount comprises comparing a height of the reference display element on and/or off the display screen with a predetermined reference value and setting the offset moving amount as the height equal to or smaller than the reference value.

32. The screen display method according to claim 28, wherein said calculating an offset moving amount comprises comparing a height of the reference display element on and/or off the display screen with a predetermined reference value and setting the offset moving amount as the height equal to or smaller than the reference value.

* * * * *

UNITED STATES PATENT AND TRADEMARK OFFICE
CERTIFICATE OF CORRECTION

PATENT NO. : 6,580,436 B1                                       Page 1 of 1
DATED      : June 17, 2003
INVENTOR(S) : Toshihiro Hishida et al.

It is certified that error appears in the above-identified patent and that said Letters Patent is hereby corrected as shown below:

<u>Title page,</u>
Item [56], References Cited, FOREIGN PATENT DOCUMENTS, please add
-- AJ       10 187 136  7/1998 --.

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,580,436 B1
DATED : June 17, 2003
INVENTOR(S) : Toshihiro Hishida et al.

It is certified that error appears in the above-identified patent and that said Letters Patent is hereby corrected as shown below:

<u>Title page,</u>
Item [56], References Cited, FOREIGN PATENT DOCUMENTS, please add
-- JP      10-187,136  7/1998 --.

Signed and Sealed this

Nineteenth Day of July, 2005

JON W. DUDAS
*Director of the United States Patent and Trademark Office*